United States Patent
Marzban et al.

(10) Patent No.: US 12,245,095 B2
(45) Date of Patent: Mar. 4, 2025

(54) INTER-BASE STATION COORDINATION FOR INTERFERENCE MANAGEMENT

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US); Arumugam Chendamarai Kannan, San Diego, CA (US); Vinay Chande, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 17/651,165

(22) Filed: Feb. 15, 2022

(65) Prior Publication Data

US 2023/0262568 A1   Aug. 17, 2023

(51) Int. Cl.
*H04W 48/00* (2009.01)
*H04W 36/00* (2009.01)
*H04W 36/32* (2009.01)

(52) U.S. Cl.
CPC ....... *H04W 36/32* (2013.01); *H04W 36/0058* (2018.08); *H04W 36/00835* (2018.08); *H04W 36/00837* (2018.08)

(58) Field of Classification Search
CPC ... H04B 17/309; H04L 12/5692; G06F 30/27; G06N 20/00; G06N 3/08; G06N 3/088; G06N 3/09; G06N 3/091; G06N 3/092; G06N 20/10; H04W 8/18; H04W 16/14; H04W 16/22; H04W 24/06; H04W 28/04; H04W 36/32; H04W 36/0058; H04W 36/00835; H04W 36/00837; H04W 48/16; H04W 48/18; H04W 72/0453; H04W 72/20; H04W 72/541; H04W 92/20
See application file for complete search history.

(56) References Cited

U.S. PATENT DOCUMENTS 8,868,091 B2 * 10/2014 Damnjanovic ..... H04W 72/542
455/450
9,559,798 B2 * 1/2017 Nuss ..................... H04L 1/1812
(Continued)

FOREIGN PATENT DOCUMENTS

WO   WO 2013/033907   * 3/2013
WO   WO 2017/204551   * 11/2017

OTHER PUBLICATIONS

International Search Report and Written Opinion—PCT/US2023/060649—ISA/EPO—Mar. 27, 2023.

*Primary Examiner* — Frank Duong
(74) *Attorney, Agent, or Firm* — Harrity & Harrity, LLP

(57) ABSTRACT

Various aspects of the present disclosure generally relate to wireless communication. In some aspects, a first network entity may generate cell information about a first cell provided at least in part by the first network entity, the cell information associated with one or more potential sources of interference at a second cell provided at least in part by a second network entity, the one or more potential sources of interference being associated with the first cell. The first network entity may communicate the cell information to the second network entity. Numerous other aspects are described.

30 Claims, 8 Drawing Sheets

(56) References Cited

U.S. PATENT DOCUMENTS

| | | |
|---|---|---|
| 9,655,132 B2* | 5/2017 | Caretti ................ H04W 72/541 |
| 10,382,174 B2* | 8/2019 | Byun .................... H04L 5/0032 |
| 2008/0233967 A1* | 9/2008 | Montojo ............ H04W 72/541 |
| | | 455/452.2 |
| 2011/0201341 A1 | 8/2011 | Choudhury et al. |
| 2014/0080491 A1 | 3/2014 | Tinnakornsrisuphap et al. |
| 2017/0353260 A1* | 12/2017 | Wang .................. H04B 7/0617 |
| 2018/0295622 A1 | 10/2018 | Sadek et al. |
| 2019/0342057 A1* | 11/2019 | Rico Alvarino ...... H04W 72/52 |
| 2020/0106579 A1 | 4/2020 | Cherian et al. |
| 2020/0314863 A1* | 10/2020 | Wang .................. H04B 17/318 |
| 2021/0100006 A1* | 4/2021 | Chendamarai Kannan ................ |
| | | H04W 56/001 |
| 2021/0100017 A1* | 4/2021 | Chendamarai Kannan ................ |
| | | H04W 72/23 |
| 2022/0095142 A1* | 3/2022 | Landis ................ H04B 17/336 |
| 2022/0150012 A1* | 5/2022 | Su ........................ H04L 5/0007 |
| 2022/0286215 A1* | 9/2022 | Tokgoz ............. H04B 17/3913 |
| 2022/0286262 A1* | 9/2022 | Tokgoz ............... H04W 72/541 |
| 2023/0035449 A1* | 2/2023 | Ryu ..................... H04L 5/0032 |

\* cited by examiner

INTER-BASE STATION COORDINATION FOR INTERFERENCE MANAGEMENT

FIELD OF THE DISCLOSURE

Aspects of the present disclosure generally relate to wireless communication and to techniques and apparatuses for inter-base station coordination for interference management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first network entity. The method may include generating cell information about a first cell provided at least in part by the first network entity, the cell information associated with one or more potential sources of interference at a second cell provided at least in part by a second network entity, the one or more potential sources of interference being associated with the first cell. The method may include communicating the cell information to the second network entity.

Some aspects described herein relate to a method of wireless communication performed by a second network entity. The method may include receiving, from a first network entity, cell information associated with one or more potential sources of interference at a second cell provided at least in part by the second network entity, the one or more potential sources of interference associated with a first cell provided at least in part by the first network entity. The method may include configuring a communication in the second cell based at least in part on the cell information associated with the first cell.

Some aspects described herein relate to a non-transitory computer-readable medium that stores a set of instructions for wireless communication by a first network entity. The set of instructions, when executed by one or more processors of the first network entity, may cause the first network entity to generate cell information about a first cell provided at least in part by the first network entity, the cell information associated with one or more potential sources of interference at a second cell provided at least in part by a second network entity, the one or more potential sources of interference being associated with the first cell. The set of instructions, when executed by one or more processors of the first network entity, may cause the first network entity to communicate the cell information to the second network entity.

Some aspects described herein relate to a non-transitory computer-readable medium that stores a set of instructions for wireless communication by a second network entity. The set of instructions, when executed by one or more processors of the second network entity, may cause the second network entity to receive, from a first network entity, cell information associated with one or more potential sources of interference at a second cell provided at least in part by the second network entity, the one or more potential sources of interference associated with a first cell provided at least in part by the first network entity. The set of instructions, when executed by one or more processors of the second network entity, may cause the second network entity to configure a communication in the second cell based at least in part on the cell information associated with the first cell.

Some aspects described herein relate to an apparatus for wireless communication. The apparatus may include means for generating cell information about a first cell provided at least in part by the first network entity, the cell information associated with one or more potential sources of interference at a second cell provided at least in part by a second network entity, the one or more potential sources of interference being associated with the first cell. The apparatus may include means for communicating the cell information to the second network entity.

Some aspects described herein relate to an apparatus for wireless communication. The apparatus may include means for receiving, from a first network entity, cell information associated with one or more potential sources of interference at a second cell provided at least in part by the second network entity, the one or more potential sources of interference associated with a first cell provided at least in part by the first network entity. The apparatus may include means for configuring a communication in the second cell based at least in part on the cell information associated with the first cell.

Some aspects described herein relate to a first network entity for wireless communication. The first network entity may include a memory and one or more processors coupled to the memory. The memory may store instructions that are executable by the one or more processors to cause the first network entity to generate cell information about a first cell provided at least in part by the first network entity, the cell information associated with one or more potential sources of interference at a second cell provided at least in part by a second network entity, the one or more potential sources of interference being associated with the first cell. The memory may store instructions that are executable by the one or more processors to cause the first network entity to communicate the cell information to the second network entity.

Some aspects described herein relate to a second network entity for wireless communication. The second network entity may include a memory and one or more processors coupled to the memory. The memory may store instructions that are executable by the one or more processors to cause the second network entity to receive, from a first network entity, cell information associated with one or more potential sources of interference at a second cell provided at least in part by the second network entity, the one or more potential sources of interference associated with a first cell provided at least in part by the first network entity. The memory may store instructions that are executable by the one or more processors to cause the second network entity to configure a communication in the second cell based at least in part on the cell information associated with the first cell.

Aspects generally include a method, apparatus, system, computer program product, non-transitory computer-readable medium, user equipment, base station, network entity, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
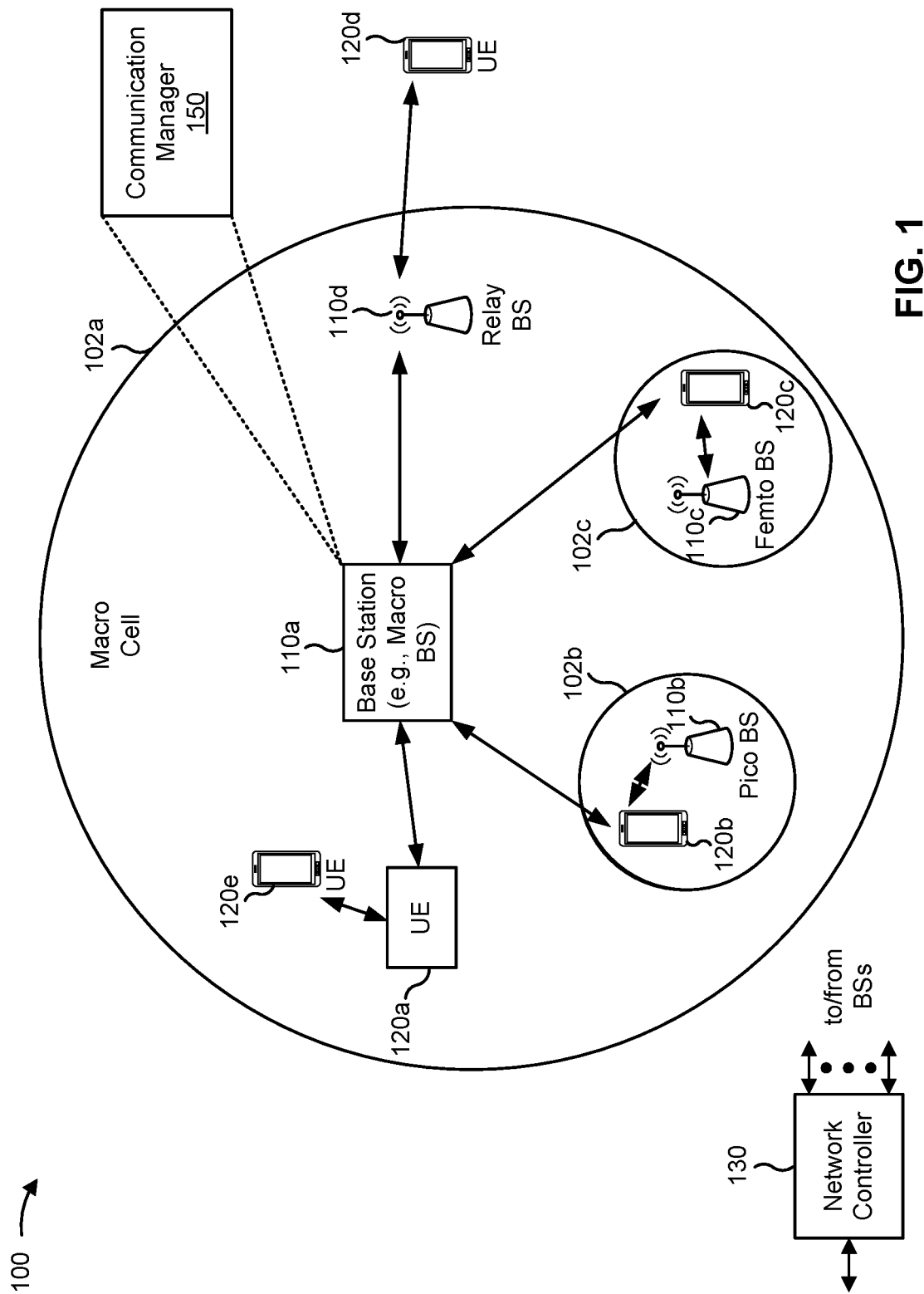
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes such as base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an evolved Node B (eNB) (e.g., in 4G), a next generation Node B (gNB) (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the base station 110 may include a communication manager 150. As described in more detail elsewhere herein, the communication manager 150 may generate cell information about a first cell provided at least in part by the base station (e.g., when the base station 110 operates as a first base station), the cell information associated with one or more potential sources of interference at a second cell provided at least in part by a second base station, the one or more potential sources of interference being associated with the first cell; and communicate the cell information to the second base station. Additionally, or alternatively, the communication manager 150 may perform one or more other operations described herein.

In some aspects, the communication manager 150 may receive, from a first base station, cell information associated with one or more potential sources of interference at a second cell provided at least in part by the base station (e.g., when the base station 110 operates as a second base station), the one or more potential sources of interference associated with a first cell provided at least in part by the first base station; and configure a communication in the second cell based at least in part on the cell information associated with the first cell. Additionally, or alternatively, the communication manager 150 may perform one or more other operations described herein.

As indicated above, FIG. 1 is provided as an example. Other examples may differ from what is described with regard to FIG. 1.

Figure 2:
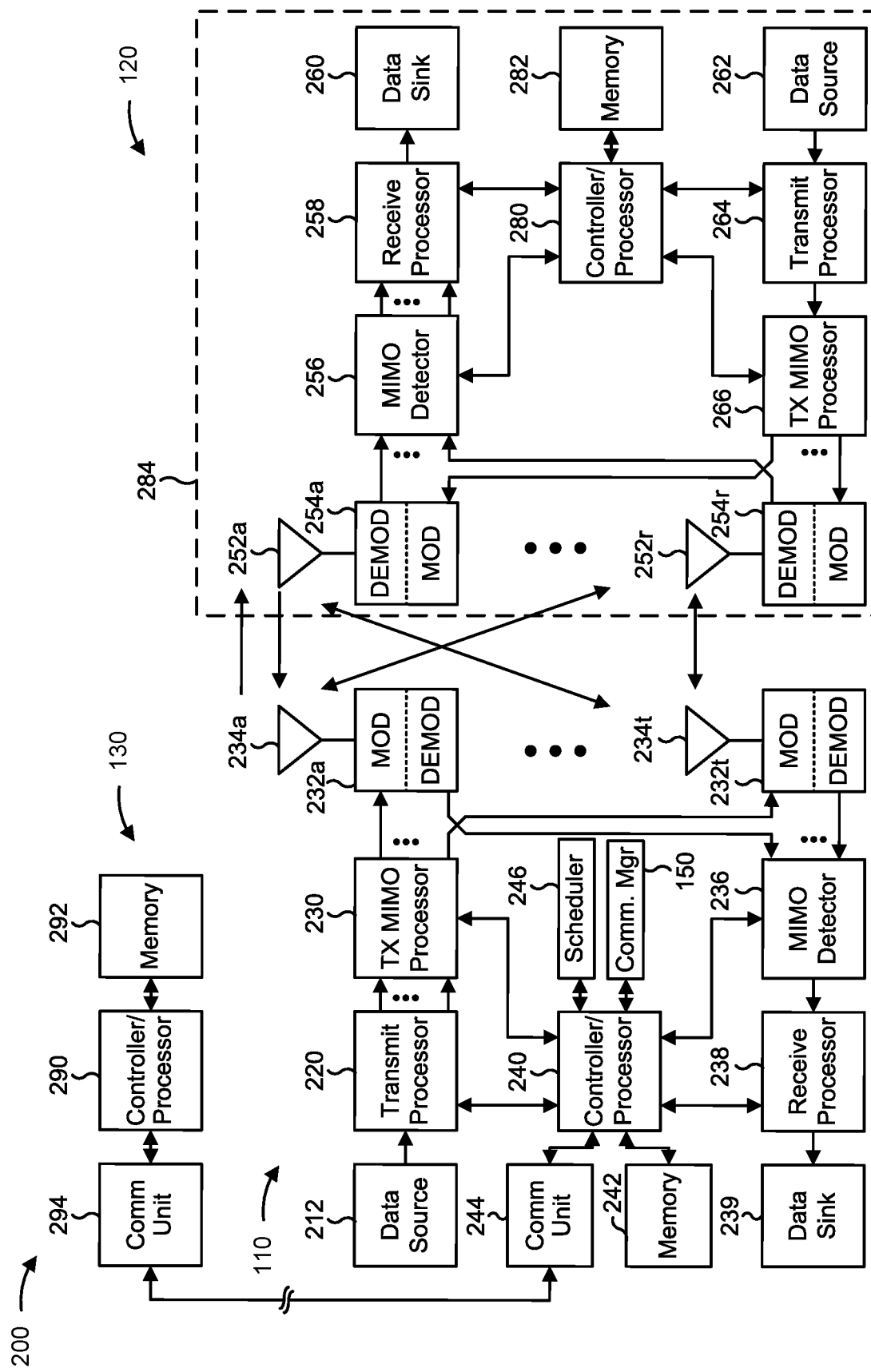
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with inter-base station coordination for interference management, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the base station includes means for generating cell information about a first cell provided at least in part by the base station (e.g., when the base station operates as a first base station), the cell information associated with one or more potential sources of interference at a second cell provided at least in part by a second base station, the one or more potential sources of interference being associated with the first cell; and/or means for communicating the cell information to the second base station. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station includes means for receiving, from a first base station, cell information associated with one or more potential sources of interference at a second cell provided at least in part by the base station (e.g., when the base station operates as a second base station), the one or more potential sources of interference associated with a first cell provided at least in part by the first base station; and/or means for configuring a communication in the second cell based at least in part on the cell information associated with the first cell. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figures 3A, 3B:
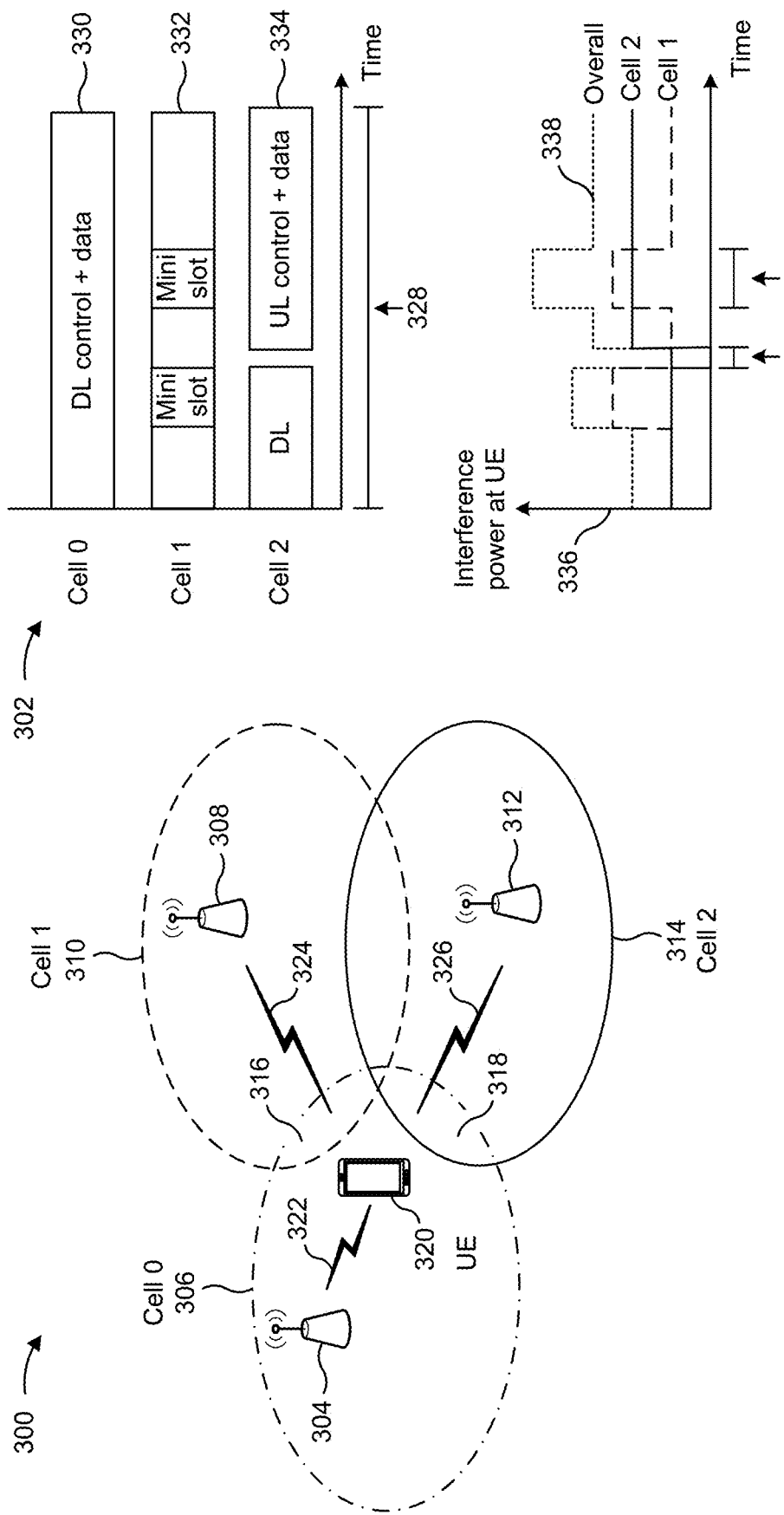
FIGS. 3A and 3B are diagrams illustrating examples of inter-base station interference, in accordance with the present disclosure.

FIGS. 3A and 3B are diagrams illustrating a first example 300 and a second example 302, respectively, of inter-base station interference (e.g., inter-gNB interference), in accordance with the present disclosure.

In the first example 300, a first base station 304 (e.g., a first base station 110) may provide wireless services over a first cell coverage area 306 (indicated in FIG. 3A by a dash-dotted line, and shown as Cell 0), a second base station 308 (e.g., a second base station 110) may provide wireless services over a second cell coverage area 310 (indicated in FIG. 3A by a dashed line, and shown as Cell 1), and a third base station 312 (e.g., a third base station 110) may provide wireless services over a third cell coverage area 314 (indicated in FIG. 3A by a solid line, and shown as Cell 2). In some aspects, the base station 304 and the base station 308 may be considered neighboring base stations based at least in part on having adjacent cell borders, overlapping cell coverage areas (e.g., region 316), and/or being located within a threshold distance of one another. Alternatively or additionally, the base station 304 and the base station 308 may be considered neighboring base stations based at least in part on determining that an interference power level, detected by one of the base stations based at least in part on a signal from the other base station, satisfies a power-level threshold value, and/or based at least in part on receiving information from a core network and/or a stored file that indicates the two base stations are neighboring base stations. Similarly, the base station 304 and the base station 312 may be considered neighboring base stations based at least in part on, for example, having overlapping cell coverage areas (e.g., region 318).

A UE located within a cell coverage area of a base station may access the services provided by the base station using one or more wireless signals. To illustrate, the base station 304 may provide services to a UE 320 (e.g., the UE 120) located within the cell coverage area 306 using a wireless signal 322. For example, the base station 304 may transmit, as the wireless signal 322, a downlink signal to the UE 320. However, the UE 320 may receive a distorted downlink signal that corresponds to the downlink signal transmitted by the base station 304 and interference caused by additional signals, such as one or more wireless signals 324 associated with the base station 308 and/or one or more wireless signals 326 associated with the base station 312. The wireless signals 324 and 326 may be associated with any combination of UL and/or DL communications in the respective cell coverage areas.

In some aspects, signal interference distorts and/or modifies a particular signal. As one example, the wireless signal 322 may be considered a wireless signal directed to and/or intended for the UE 320 (e.g., the base station 304 generates the wireless signal 322 based at least in part on a communication directed to at least the UE 320). As another example, the wireless signal 322 may be intended for multiple UEs, such as a group of UEs or all UEs in the first cell coverage area 306. The wireless signals 324 and 326, however, may be directed to, intended for, and/or associated with other UEs (not shown in FIG. 3A) operating in the respective cell coverage areas 310 and 314 of the base station 308 and the base station 312. Because the wireless signals 324 and 326 are directed to, intended for, and/or are associated with other UEs (and not the UE 320), the UE 320 may receive at least portions of the wireless signals 324 and 326 as distortion and/or noise to the wireless signal 322, which may cause recovery errors, reduce data throughput, and/or increase data-transfer latency at the UE 320. In some aspects, inter-base station interference denotes distortion to a first signal associated with a first base station, where the distortion originates from a second signal associated with a second base station. For instance, the first signal may be directed to and/or intended for a first UE, and the second signal may be directed to and/or intended for a different device (e.g., another UE and/or a base station). As used herein, "distortion" can include noise or any other modification of a first signal, as caused by one or more second signals, as experienced by a recipient of the first signal. For example, inter-base station interference may include noise due to the second signal as experienced by the UE 320 receiving the first signal.

To illustrate, and as shown by the example 302, the base station 304 may transmit, to the UE 320 and using the wireless signal 322, DL control information and/or data over a time duration 328 as shown by reference number 330. In some aspects, the base station 304 may generate the wireless signal 322 based at least in part on DL control information and/or data that is directed to and/or is intended for at least the UE 320. As shown by reference number 332, the neighboring base station 308 may also transmit within the time duration 328. For example, the base station 308 may use the wireless signals(s) 324 to transmit control information and/or data within two mini-slot time durations (e.g., transmit to another base station, to a UE, to a satellite), shown within the time duration as "Mini slot." Similarly, and as shown by reference number 334, the neighboring base station 312 may communicate within the time duration. For example, the base station 312 may use the wireless signal(s) 326 to transmit DL control information and/or user data in a first portion of the time duration 328 and receive UL control information and/or data over a second portion of the time duration 328 (e.g., transmit to or receive from another base station, a UE, or a satellite).

Graph 336 illustrates example interference power received by the UE 320 over the time duration 328 and based at least in part on the transmissions shown by the reference numbers 332 and 334. As shown by reference number 338, an overall interference power level may be considered the combined interference power of the interference signals transmitted by the base station 308 and the base station 312. The overall interference power may vary over the time duration 328 based at least in part on the different transmission configurations of the interference signals. To illustrate, interference received by the UE 320 over a first time duration 340 may be significantly less than interference received by the UE 320 over a second time duration 342. Because these fluctuations may occur over short time durations (e.g., sub-symbol or sub-slot time durations), the interference may be difficult to measure and, subsequently, mitigate.

Some RATs, such as NR, may allow devices additional flexibility in transmission configurations relative to prior RATs (e.g., LTE), such as variable time-slot sizes (e.g., full slot, mini-slot, multi-slot), unscheduled transmissions (e.g., without a grant), arbitrary start symbols (e.g., enhanced Mobile Broadband (eMBB) transmissions), punctured transmissions (e.g., a first transmission interrupted by a second transmission over a same frequency and/or time air interface resource), adaptive reference signal patterns (e.g., varying transmission patterns based on antenna ports, Doppler spread, and/or delay tolerance at a receiver), variable beam pair links (BPLs), changing beam directions, and so forth. This flexibility may cause bursty interference, as shown by the overall interference power level shown by reference number 338. In some aspects, bursty interference denotes dynamically changing interference that varies over short time durations. To illustrate, bursty interference may be considered interference that has multiple power level changes over a time duration, where the power levels may fluctuate more than a threshold value multiple times over multiple time partitions within the time duration. Bursty interference may be difficult to measure and, subsequently, difficult to mitigate (e.g., compensate for at a receiver). In some aspects, the first base station may transmit an indication of interference to the second base station, such as an overload indicator (OD, when a specific resource block (RB) has interference and/or may transmit a high interference indicator (HII) that indicates RBs used by UEs close to a boundary between the base stations. However, and similar to measuring bursty interference, these indicators may lack detail, and thus may not enable the second base station to mitigate the bursty interference. Thus, bursty interference, such as inter-base station interference as shown by the examples 300 and 302, may result in increased recovery errors at a receiver, reduced data throughput, and/or increased data-transfer latency.

Some techniques and apparatuses described herein provide inter-base station coordination for interference management. Inter-base station coordination may denote coordination (e.g., a sharing of information) between at least two network entities (e.g., base stations), such as a sharing of information associated with inter-base station interference characteristics (e.g., periodicity, time duration, frequency). As one example, a first network entity may share, with a second network entity, cell information associated with a first cell provided at least in part by the first network entity. The cell information may include cell-specific scheduling and/or configuration information associated with the first cell, UE-specific scheduling and/or configuration information associated with active UEs operating in or associated with the first cell, and/or UE location information associated with the active UEs. In some aspects, an active UE denotes a UE with an established communication link with a network entity, where the established communication link may correspond to the active UE operating in a radio resource control (RRC) IDLE state, an RRC CONNECTED state, and/or an RRC INACTIVE state. However, in some aspects, an active UE may alternatively or additionally denote UEs without an established communication link with the network entity (e.g., a UE that is camped on a cell provided at least in part by a network entity).

The second network entity may identify and/or characterize potential sources of inter-base station interference by analyzing the cell information associated with the first network entity. Identifying and/or characterizing a potential source of inter-base station interference may include identifying one or more interference transmissions (e.g., DL transmissions to one or more UEs in the first cell, UL transmissions from one or more UEs in the first cell, broadcast transmissions from the first network entity, and/or multicast transmissions from the first network entity) and/or interference transmission characteristics, such as a frequency resource, a time resource, a beam resource, a time duration, a bandwidth, and/or a periodicity associated with the interference transmission. Based at least in part on identifying and/or characterizing the potential sources of inter-base station interference, the second network entity may configure various communications, such as by selecting air interface resource assignments (e.g., frequency assignments, time assignments, and/or beam assignments) for communications associated with the second network entity. The selected communication configurations, such as a configuration for a DL communication, an UL communication, and/or a null tone, may be based at least in part on avoiding and/or reducing a presence of inter-base station interference. A null tone may be considered a particular air interface resource that corresponds to an absence of intended transmissions (e.g., the wireless signal 322) and/or include only noise and/or interference, such that a UE (or another device) can measure that noise and/or interference. For example, a null tone may provide an open resource on which a UE can measure interference, or may ensure that communications are not transmitted in resources associated with a threshold interference. A null tone can include any combination of resources.

By selecting communication configurations based at least in part on the cell information from the first network entity, the second network entity may mitigate and/or reduce inter-base station interference in communications. The second network entity may alternatively or additionally improve an accuracy of an interference measurement generated by a UE. The shared cell information may improve how the second network entity selects air interface resource assignments (e.g., to mitigate interference) and, subsequently, may improve signal quality at a receiver. Improved signal quality at a receiver improves a performance of communications by reducing recovery errors, improving data throughput, and/or reducing data-transfer latencies.

In some aspects, a first network entity generates cell information about a first cell provided at least in part by the first network entity, where the cell information may be associated with one or more potential sources of interference at a second cell provided at least in part by a second network entity, and where the one or more potential sources of interference may be associated with the first cell. The first network entity may communicate the cell information to the second network entity, which may improve how the second network entity schedules communications within the second cell. As one example, the second network entity may select beam configurations based at least in part on avoiding beams associated with transmissions to an active UE in the first cell.

In some aspects, a second network entity receives, from a first network entity, cell information associated with one or more potential sources of interference at a second cell provided at least in part by the second network entity, where the one or more potential sources of interference is associated with a first cell provided at least in part by the first network entity. Based at least in part on receiving the cell information from the first network entity, the second network entity may configure a communication in the second cell. The shared cell information may improve how the second network entity mitigates inter-base station interference associated with the first cell by improving how the second network entity schedules communications.

As indicated above, FIGS. 3A and 3B are provided as examples. Other examples may differ from what is described with regard to FIGS. 3A and 3B.

Figure 4:
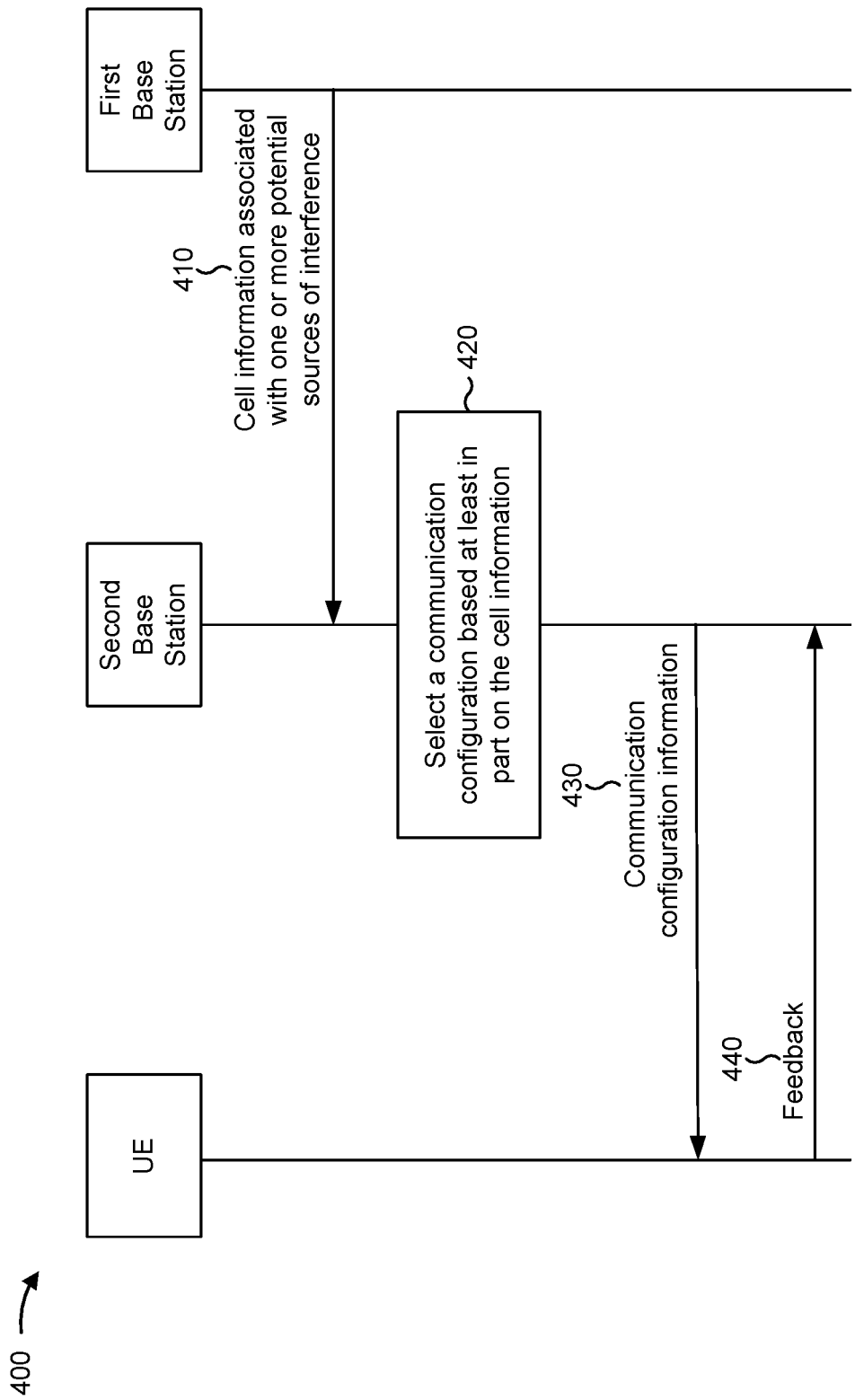
FIG. 4 is a diagram illustrating an example of inter-base station coordination for interference management, in accordance with the present disclosure.

FIG. 4 is a diagram illustrating an example 400 of inter-base station coordination for interference management, in accordance with the present disclosure. The example 400 includes a first base station (e.g., the BS 308, the BS 312, the BS 110, and/or the apparatus 800 described in connection with FIG. 8), a second base station (e.g., the BS 110, the BS 304, and/or the apparatus 800 described in connection with FIG. 8), and a UE (e.g., the UE 120 and/or the UE 320). In example 400, a first base station coordinates (e.g., shares information) with a second base station for interference management by the second base station. While the example 400 shows two base stations coordinating for interference management, alternate or additional network entities may participate, such as a radio unit, a distributed unit, and/or a central unit of a distributed base station. For example, the first base station may include a network entity that controls a first radio unit, and the second base station may include a network entity that controls a second radio unit (e.g., the same network entity or different network entities).

As shown by reference number 410, the first base station may transmit, and the second base station may receive, cell information, where the cell information is associated with a first cell provided at least in part by the first base station. The cell information may indicate information about one or more potential sources of interference associated with the first base station. In some aspects, the first base station may transmit the cell information to the second base station using a wired communication link, such as an Xn interface. In some aspects, the first base station may transmit the cell information using a wireless link, such as an integrated access and backhaul (IAB) wireless link or another over-the-air (OTA) link. In some aspects, the first base station may transmit the cell information to the second base station based at least in part on identifying the second base station as a neighboring base station. Alternatively or additionally, the first base station may transmit the cell information to the second base station based at least in part on transmitting the cell information to a defined group of base stations and/or cells (e.g., all base stations known to the first base station). The cell information may indicate, for example, one or more cell-specific scheduling parameters associated with the first cell, one or more UE-specific scheduling parameters associated with an active UE in the first cell, and/or UE location information. As one example, the cell-specific scheduling parameters may indicate cell scheduling information and/or cell configuration information associated with a first cell provided at least in part by the first base station. To illustrate, the cell-specific scheduling parameters may indicate a number of active UEs associated with the first cell, a loading metric associated with the first cell (e.g., a resource utilization of the first base station), a number of active beams associated with the first cell, a scheduling scheme associated with the first cell, a scheduling granularity associated with the first cell, or a sub-carrier spacing value associated with the first cell.

Each of these cell-specific scheduling parameters is described below. As mentioned above, an active UE may be considered a UE with an established communication link with the first base station.

The number of active UEs may correspond to all active UEs operating in the first cell. Alternatively, the active UEs may correspond to only active UEs within a threshold distance of a boundary between a first cell coverage area associated with the first cell and a second cell coverage area associated with a second cell (e.g., a neighboring cell, such as the cell of the second base station). To illustrate, the first base station may determine to transmit the cell information to the second base station based at least in part on identifying that the second base station is a neighboring base station. To calculate the number of active UEs, and based at least in part on identifying that the second base station is a neighboring base station, the first base station may determine a number of UEs within the first cell that are located within a threshold distance of a boundary between the first cell and the second cell (e.g., based at least in part on timing advance values associated with those UEs, propagation delays associated with those UEs, and/or locations associated with those UEs).

The first base station may also omit, from the number of active UEs, UEs that are located more than the threshold distance from the boundary.

The loading metric may indicate an amount of air interface resources consumed by communications in the first cell and/or an amount of data being communicated in the first cell, where the communications may be considered a potential source of interference. Thus, the loading metric may indicate a likelihood of interference by the first cell by indicating whether the air interface resources associated with the first cell are being used at full capacity, at moderate capacity, and/or at low capacity. To illustrate, the loading metric may indicate a percentage of air interface resource usage within the first cell, such as within a time duration. In a similar manner, a number of active UEs and/or a number of active beams may indicate a likelihood of interference from the first cell by providing information about how many devices may be accessing the air interface resources and/or communicating using the active beams.

In some aspects, a scheduling scheme may indicate a periodicity and/or scheduling arrangement that indicates a manner in which the first base station services active UEs operating in the first cell, where servicing an active UE denotes providing the active UE with air interface resources to transmit or receive communications in a cell. For instance, the scheduling scheme may indicate a round-robin scheduling scheme in which the first base station services each UE over a respective cyclic and/or fixed time slot. As another example, the scheduling scheme may indicate a proportional-fair scheduling scheme in which the first base station services each UE based at least in part on priority and/or anticipated resource consumption of each UE. Thus, the scheduling scheme may provide an indication of a frequency and/or time duration for interference based at least in part on a manner in which the first base station services UEs (e.g., by indicating a time at which the first base station may communicate with a UE in the first cell).

A scheduling granularity may indicate a minimum scheduling grant assigned by a first base station associated with the first cell to UEs for communications (e.g., DL and/or UL communications) within the first cell. Examples of scheduling granularities may include any combination of a mini-slot level scheduling granularity, a slot-level scheduling granularity, and/or a multi-slot level scheduling granularity.

A UE-specific scheduling parameter may indicate UE-specific information about a particular active UE operating in a cell. The UE-specific information may provide information about a potential source of interference associated with the particular active UE. To illustrate, a UE-specific scheduling parameter may indicate any combination of a UE location, a link direction, a traffic type, a use case type, a beam characteristic, a scheduling granularity, and/or a sub-carrier spacing (SCS) value. In some aspects, the UE-specific scheduling parameter may indicate a cell group (CG) configuration and/or a semi-persistent scheduling (SPS) configuration. The cell information may include one or more UE-specific scheduling parameters for the particular UE and/or the cell information may include UE-specific scheduling parameter(s) for multiple active UEs operating in the first cell. Each of these parameters is described below.

A UE location may indicate a first location of the particular UE relative to a center of a first cell (e.g., relative to the first base station) and/or a second location of the particular UE relative to a boundary of the first cell and/or the second cell. A link direction may indicate whether the UE is receiving DL communications or transmitting UL communications, and/or may indicate a distribution between DL communications and UL communications (e.g., 90% DL communications and 10% UL communications). A traffic type may indicate one or more types of data traffic associated with the particular UE, such as File Transfer Protocol (FTP) data traffic, Voice over Internet Protocol (VoIP) data traffic, cloud gaming data traffic, video streaming data traffic, conference call data traffic, and/or extended reality (XR) data traffic (e.g., virtual reality (VR) data traffic, augmented reality (AR) data traffic, and/or mixed reality (MR) data traffic). A use case type may indicate one or more use case types associated with the particular UE and/or communications associated with the particular UE, such as an eMBB type, an Ultra Reliable Low Latency Communications (URLLC) type, or a massive Machine Type Communications (mMTC) type.

A beam characteristic may indicate properties and/or characteristics about an active beam being used in the first cell. As one example, the beam characteristic may indicate a beam identifier (ID) that maps and/or refers to a particular beam (e.g., direction) and/or a particular channel state information reference signal (CSI-RS) resource associated with the beam. Alternatively or additionally, the beam characteristic may indicate any combination of a direction, an azimuth angle, and/or elevation angle of the active beam. In some aspects, the beam characteristic indicates a synchronization signal block (SSB) index associated with the active beam and/or a transmission configuration indication (TCI) state associated with the active beam.

In some aspects, the first base station may include, in the cell information, one or more UE-specific scheduling parameters associated with each active UE of the first cell operating at a location that satisfies (e.g., is located within) a threshold distance of and/or to a boundary between a first cell coverage area of the first cell and a second cell coverage area of the second cell. For example, the first base station may include the one or more UE-specific scheduling parameters based at least in part on identifying that the second base station is a neighboring base station. Alternatively or additionally, the base station may omit UE-specific scheduling parameters associated with each active UE of the first cell that operates at a location that fails to satisfy the threshold distance of the boundary (e.g., is located outside of the threshold distance). Omitting the UE-specific scheduling parameters based on UE location helps reduce an amount of data included in the cell information and, subsequently, helps reduce an amount of data exchanged between the base stations. For wireless-based communication links between base stations, such as an IAB link, the reduced data exchange helps preserve air interface resources for other communications.

In some aspects, the first base station transmits, and the second base station receives, the cell information periodically. Alternatively or additionally, the first base station may communicate, and the second base station may receive, the cell information aperiodically. To illustrate, the first base station may communicate the cell information to the second base station based at least in part on receiving a query from the second base station for the cell information (not shown in FIG. 4) and/or based at least in part on identifying a potential-interference trigger event, where a potential-interference trigger event may indicate a change in potential interference at another cell. To illustrate, the base station may identify, as a potential-interference trigger event, that a UE location has changed more than a first threshold value, a signal level associated with a UE has changed more than a second threshold value, a number of active beams associated with the first cell has changed more than a third threshold value, and/or a number of active UEs within the first cell has changed more than a fourth threshold value. The changes may include increases and/or decreases in number counts, signal levels, and/or distances (e.g., relative to a center of a cell, relative to a base station, and/or relative to a boundary).

As shown by reference number 420, the second base station may select a communication configuration based at least in part on the cell information received from the first base station. As one example, the second base station may select a communication configuration based at least in part on mitigating the one or more potential sources of interference, such as by selecting a null tone configuration, a beam configuration associated with UE communications, a frequency assignment associated with the UE communications, and/or a time assignment associated with the UE communications, with a higher likelihood of low interference relative to other communication configurations. To illustrate, assume the cell information indicates that a first UE operating in the first cell is located within a threshold distance to a boundary between the first cell coverage area and the second coverage area and is receiving DL communications associated with VoIP communications using a particular beam. Based at least in part on the cell information, the second base station may select a communication configuration for DL communications to a second UE operating in the second cell coverage area that uses a different beam, a different frequency assignment, and/or a different timing assignment than those used for the first UE, which may mitigate interference from the DL communications to the first UE.

As another example, the second base station may select a null tone configuration based at least in part on the cell information, such as a first null tone configuration associated with higher and/or peak interference associated with the first base station or a second null tone configuration associated with lower interference from the first base station. In some aspects, a null tone configuration indicates particular time and/or frequency resources associated with no transmission power (e.g., no assignments for transmissions to or from the UE, sometimes called zero power (ZP) transmissions). The second base station may instruct a UE to generate an interference measurement based at least in part on the null tone configuration to measure interference.

Figure 5:
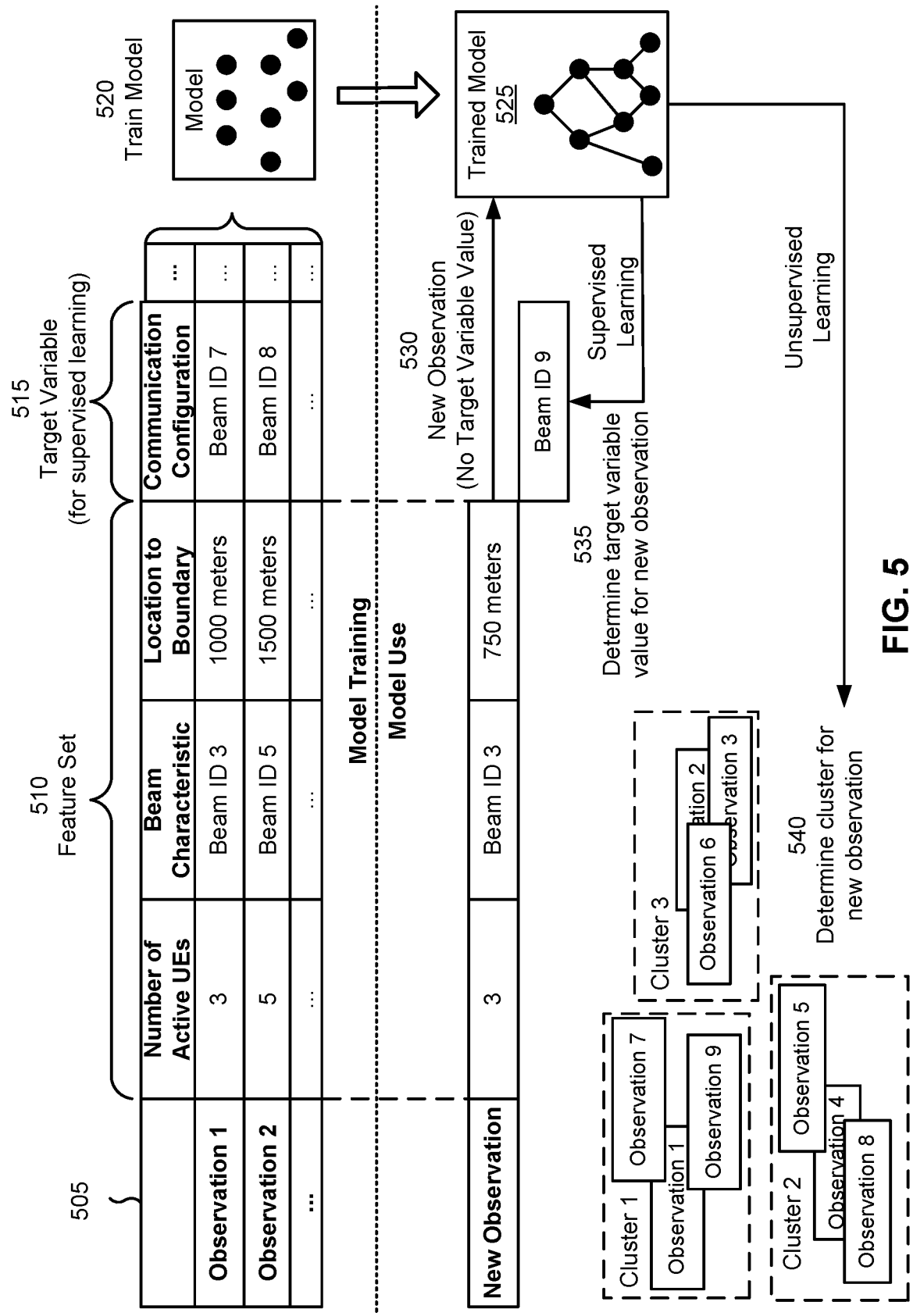
FIG. 5 is a diagram illustrating an example of training and using a machine learning model in accordance with the present disclosure.

In some aspects, the second base station may select the communication configuration based at least in part on a model trained using a machine learning algorithm, such as that described with regard to FIG. 5, and/or select the communication configuration based at least in part on a static algorithm. In some aspects, a machine learning algorithm may identify patterns in data through training and/or feedback and modify logic implemented in the model based on the training. A static algorithm may use predefined logic and/or rules that do not change. In some aspects, the second base station may use a model trained on a machine learning algorithm and/or a static algorithm to characterize the potential sources of interference associated with communications in the first cell (e.g., identifying a frequency resource, a time resource, a beam resources, and/or a periodicity associated with interference transmissions). Alternatively or additionally, the second base station may use the model to select communication configurations.

As shown by reference number 430, the second base station may transmit, and a UE may receive, communication configuration information that is based at least in part on the cell information. In some aspects, the second base station transmits DL communication assignments and/or UL communication assignments associated with the UE, where the communication assignments are based at least in part on mitigating interference from the first cell. Alternatively or additionally, the second base station may instruct the UE to generate an interference measurement and may indicate, as the communication configuration information, a null tone configuration as further described.

As shown by reference number 440, the UE may transmit, and the second base station may receive, feedback associated with the communication configuration information. As one example, the UE may transmit an interference measurement. As another example, the UE may transmit signal-quality and/or link-quality measurements based at least in part on DL communications from the second base station, such as a bit error rate (BER), a block error rate (BLER), SNR, RSSI, and/or RSRP. Alternatively or additionally, the second base station may generate signal-quality and/or link-quality measurements based at least in part on UL communications from the UE. In some aspects, the second base station may train a machine learning algorithm and/or update a model based on a machine learning algorithm based at least in part on using the feedback, signal-quality measurements, and/or link-quality measurements, as further described with regard to FIG. 5.

In some aspects, inter-base station coordination enables a second base station to mitigate inter-base station interference associated with a first base station. By analyzing cell information associated with the first base station, the second base station may select communication configurations that avoid and/or reduce the inter-base station interference and improve a signal quality at a receiver. Alternatively or additionally, the second base station may improve interference measurements at a UE and, subsequently, receive (from the UE) information that improves a manner in which the second base station selects the communication configurations to improve receiver signal quality. Improved receiver signal quality improves a performance of communications in the second cell by reducing recovery errors, improving data throughput, and/or reducing data-transfer latencies.

As indicated above, FIG. 4 is provided as an example. Other examples may differ from what is described with regard to FIG. 4.

FIG. 5 is a diagram illustrating an example 500 of training and using a machine learning model in connection with inter-base station coordination for interference management. The machine learning model training and usage described herein may be performed using a machine learning system. The machine learning system may include or may be included in a computing device, a server, a cloud computing environment, or the like, such as a base station selecting communication configurations (e.g., the second base station, the BS 110, and/or apparatus 800) as described in more detail elsewhere herein.

As shown by reference number 505, a machine learning model may be trained using a set of observations. The set of observations may be obtained from training data (e.g., historical data), such as data gathered during one or more processes described herein. In some implementations, the machine learning system may receive the set of observations (e.g., as input) from one or more base stations (e.g., the BS 110, a first base station and/or a second base station) and/or a UE (e.g., the UE 120), as described elsewhere herein.

As shown by reference number 510, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from a UE (e.g., the UE 120) and/or one or more base stations (e.g., the BS 110, a first base station and/or a second base station). For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a cell-specific scheduling parameter (shown as a number of active UEs), a second feature of a first UE-specific scheduling parameter (shown as a beam ID associated with a particular UD), a third feature of a second UE-specific scheduling parameter (shown as a UE location relative to a boundary between cell coverage areas), and so on. As shown, for a first observation, the first feature may have a value of 3 (e.g., 3 active UEs), the second feature may have a value of a beam ID of 3, the third feature may have a value of 1000 meters, and so on. These features and feature values are provided as examples, and may differ in other examples. For example, the feature set may include one or more of the following features: a number of active UEs associated with a cell (e.g., a neighboring cell), a loading metric associated with the cell, a number of active beams associated with the cell, a scheduling scheme associated with the cell, a UE location, a link direction associated with the UE, a traffic type associated with the UE, a use case type associated with the UE, a beam characteristic associated with the UE, a cell group associated with the UE, a semi-persistent scheduling configuration associated with the UE, a scheduling granularity associated with the UE, and/or a sub-carrier spacing value associated with the UE.

As shown by reference number 515, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 500, the target variable is a communication configuration, which has a value of a beam identity for the first observation. However, the target variable may include multiple values, such as a first value associated with a frequency assignment, a second value associated with a time assignment, and/or a third value associated with a scheduling granularity. Alternatively or additionally, the target variable may be an interference characteristic (e.g., a power level, a frequency, a bandwidth, a time duration).

The feature set and target variable described above are provided as examples, and other examples may differ from what is described above. For example, for a target variable of communication configuration that includes a frequency assignment, the feature set may include a UE-specific scheduling parameter associated with frequency assignments to a particular UE.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 520, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 525 to be used to analyze new observations.

As an example, the machine learning system may obtain training data for the set of observations based on historical data. For example, a base station may access historical data records on a server and/or past observations of the base station, where the historical data specifies multiple feature sets, such as combinations of one or more cell-specific scheduling parameters and/or one or more UE-specific scheduling parameters, with a variety of values for the feature set combinations. To illustrate, the historical data may include a first feature set that includes three UE-specific scheduling parameters for each of five different UEs (e.g., any combination of UE-specific scheduling parameters as described with regard to FIG. 4), which results in at least 15 values for the first feature set. Alternatively or additionally, the historical data may include a second feature set that includes three cell-specific scheduling parameters and two UE-specific scheduling parameters, and so forth. For each feature set, the historical data may include 20 observations that vary the values within the feature set and a target communication configuration associated with the observation, such as a target communication configuration that indicates a frequency assignment and a timing assignment. Alternatively or additionally, the historical data may include an interference characteristic.

As shown by reference number 530, the machine learning system may apply the trained machine learning model 525 to a new observation, such as by receiving a new observation and inputting the new observation to the trained machine learning model 525. As shown, the new observation may include a first feature of a number of active UEs with a value of 3, a second feature of a beam characteristic with value that indicates a beam ID of 3, a third feature of a UE location relative to a boundary with a value of 750 meters, and so on, as an example. The machine learning system may apply the trained machine learning model 525 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 525 may predict a value that indicates a beam ID of 3 for the target variable of a communication configuration for the new observation, as shown by reference number 535. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a beam ID, a frequency assignment, a time assignment, and/or a scheduling granularity associated with a communication configuration. The first automated action may include, for example, instructing a UE to generate an interference measurement, a signal-quality measurement, and/or a link-quality measurement based at least in part on the recommended communication configuration.

In some implementations, the trained machine learning model 525 may classify (e.g., cluster) the new observation in a cluster, as shown by reference number 540. The observations within a cluster may have a threshold degree of similarity. As an example, if the machine learning system classifies the new observation in a first cluster (e.g., a cluster associated with a particular communication configuration, signal-quality measurements within a first threshold value, and/or link-quality measurements within a second threshold value), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to select a communication configuration associated with communications in a second cell based at least in part on cell information associated with a first cell. The machine learning system enables recognition and/or identification of tens, hundreds, thousands, or millions of features and/or feature values for tens, hundreds, thousands, or millions of observations, thereby increasing accuracy and consistency and reducing delay associated with selecting a communication configuration relative to requiring computing resources to be allocated for tens, hundreds, or thousands of operators to manually select the communication configuration using the features or feature values.

As indicated above, FIG. 5 is provided as an example. Other examples may differ from what is described in connection with FIG. 5.

Figure 6:
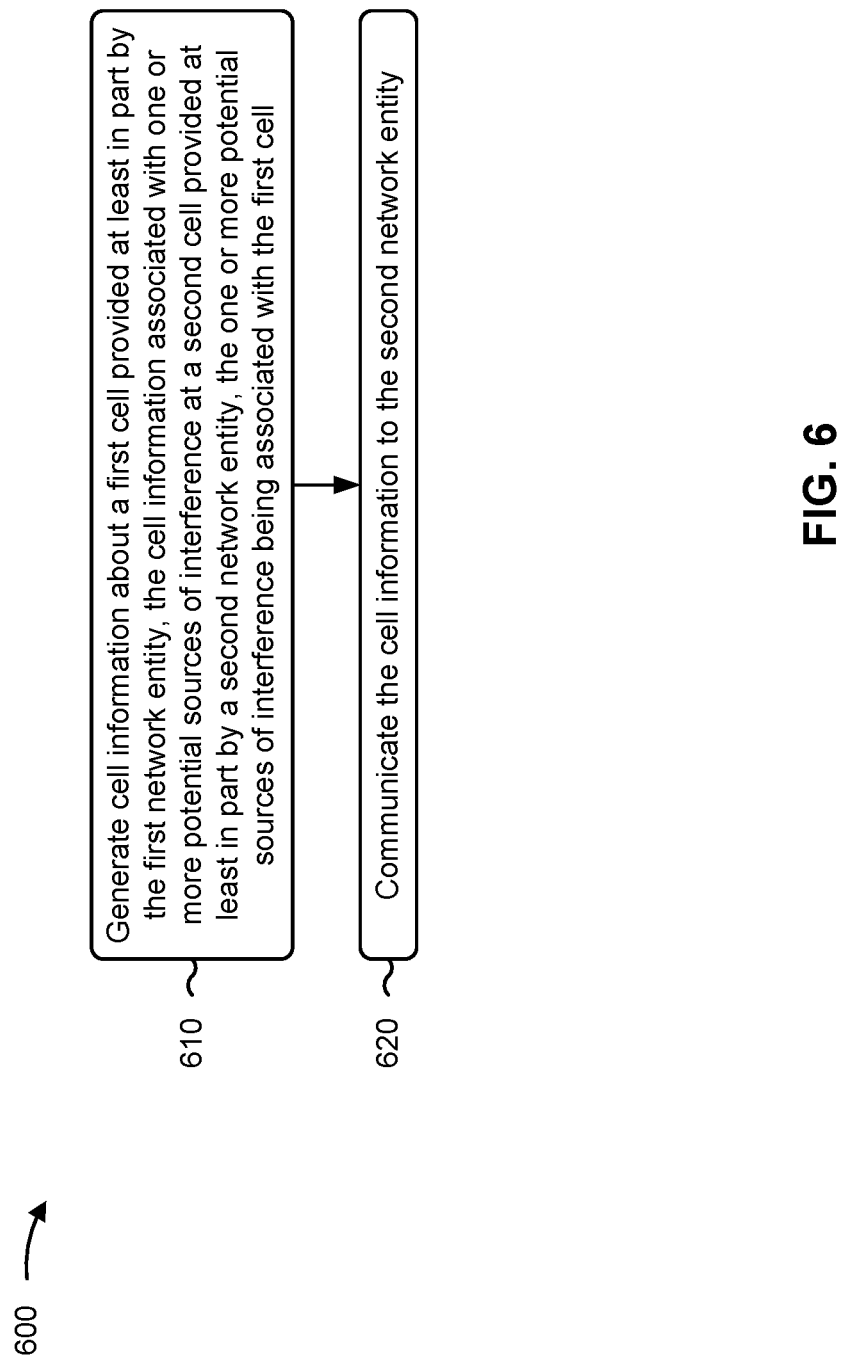
FIG. 6 is a diagram illustrating an example process performed by a base station in accordance with the present disclosure.

FIG. 6 is a diagram illustrating an example process 600 performed, for example, by a first network entity, in accordance with the present disclosure. Example process 600 is an example where the first network entity (e.g., base station 110, apparatus 800) performs operations associated with inter-base station coordination for interference management. A network entity that performs aspects of the process 600 may alternatively or additionally perform aspects of process 700 as further described.

As shown in FIG. 6, in some aspects, process 600 may include generating cell information about a first cell provided at least in part by the first network entity, the cell information associated with one or more potential sources of interference at a second cell provided at least in part by a second network entity, the one or more potential sources of interference being associated with the first cell (block 610). For example, the first network entity (e.g., using communication manager 150 and/or generation component 808, depicted in FIG. 8) may generate cell information about a first cell provided at least in part by the first network entity, the cell information associated with one or more potential sources of interference at a second cell provided at least in part by a second network entity, the one or more potential sources of interference being associated with the first cell, as described above.

As further shown in FIG. 6, in some aspects, process 600 may include communicating the cell information to the second network entity (block 620). For example, the first network entity (e.g., using communication manager 150 and/or generation component 808, depicted in FIG. 8) may communicate the cell information to the second network entity, as described above. Providing a second network entity with cell information associated with a first cell provided at least in part by the first network entity may help mitigate inter-base station interference at the second cell, help reduce recovery errors at devices operating in the second cell, improve data throughput in the second cell, and/or reduce data-transfer latencies in the second cell.

Process 600 may include additional aspects, such as any single aspect or any combination of aspects described below and/or in connection with one or more other processes described elsewhere herein.

In a first aspect, the cell information includes at least one of a cell-specific scheduling parameter, or a UE-specific scheduling parameter.

In a second aspect, alone or in combination with the first aspect, the cell-specific scheduling parameter indicates at least one of a number of active UEs associated with the first cell, a loading metric associated with the first cell, a number of active beams associated with the first cell, a scheduling scheme associated with the first cell, a scheduling granularity associated with the first cell, or a sub-carrier spacing value associated with the first cell.

In a third aspect, alone or in combination with one or more of the first and second aspects, the scheduling scheme indicates at least one of a round-robin scheduling scheme, or a proportional-fair scheduling scheme. This may help indicate a periodicity and/or time duration associated with potential interference and, subsequently, help identify communication configurations to mitigate and/or measure the interference.

In a fourth aspect, alone or in combination with one or more of the first through third aspects, the scheduling granularity indicates at least one of a mini-slot level scheduling granularity, a slot level scheduling granularity, or a multi-slot level scheduling granularity.

In a fifth aspect, alone or in combination with one or more of the first through fourth aspects, a UE-specific scheduling parameter indicates a UE location, a link direction, a traffic type, a use case type, a beam characteristic, a cell group, or a semi-persistent scheduling configuration.

In a sixth aspect, alone or in combination with one or more of the first through fifth aspects, the traffic type indicates at least one of File Transfer Protocol data traffic, Voice over Internet Protocol data traffic, clouding gaming data traffic, videoing streaming data traffic, conference call data traffic, or extending reality data traffic. This may help identify time durations with multiple transmissions (e.g., user data) and, subsequently, help identify communication configurations to mitigate and/or measure the interference.

In a seventh aspect, alone or in combination with one or more of the first through sixth aspects, the use case type indicates at least one of an enhanced Mobile Broadband type, an Ultra Reliable Low Latency Communications type, or a massive Machine Type Communications type.

In an eighth aspect, alone or in combination with one or more of the first through seventh aspects, the beam characteristic includes at least one of an azimuth angle associated with an active beam, an elevation angle of the active beam, a synchronization signal block index associated with the active beam, or a transmission configuration indication state associated with the active beam.

In a ninth aspect, alone or in combination with one or more of the first through eighth aspects, communicating the cell information to the second network entity further comprises identifying the second network entity as a neighbor network entity, and communicating the cell information to the second network entity based at least in part on identifying the second network entity as the neighbor network entity. This may help the first network entity identify base stations that may (and/or may not) be affected by inter-base station interference from the first network entity and, subsequently, reduce unrelated communications to base stations not affected by the inter-base station interference. Reducing communications helps preserve communication resources for other purposes.

In a tenth aspect, alone or in combination with one or more of the first through ninth aspects, the cell information further indicates a number of active UEs within the first cell that are within a threshold distance of a boundary between the first cell and the second cell.

In an eleventh aspect, alone or in combination with one or more of the first through tenth aspects, generating the cell information further comprises including, in the cell information, one or more UE-specific scheduling parameters associated with each active UE of the first cell associated with a location that satisfies a threshold distance of a boundary between a first cell coverage area of the first cell and a second cell coverage area of the second cell, and omitting, from the cell information, one or more UE-specific scheduling parameters associated with each active UE of the first cell associated with a location that fails to satisfy the threshold distance of the boundary.

In a twelfth aspect, alone or in combination with one or more of the first through eleventh aspects, communicating the cell information to the second network entity further comprises periodically communicating the cell information to the second network entity, or aperiodically communicating the cell information to the second network entity. This can help improve a response time of the second network entity to changing communication configurations by pushing information to the second network entity without delay.

In a thirteenth aspect, alone or in combination with one or more of the first through twelfth aspects, process 600 includes receiving a query from the second network entity for the cell information, and communicating the cell information to the second network entity based at least in part on receiving the query. Query-based communications may help make communication transactions more efficient by reducing an amount of communications exchanged between devices.

In a fourteenth aspect, alone or in combination with one or more of the first through thirteenth aspects, process 600 includes identifying a potential-interference trigger event, and communicating the cell information to the second network entity based at least in part on identifying the potential-interference trigger event. This can help improve a response time of the second network entity to changing communication configurations by pushing information to the second network entity in response to detecting changes in the potential interference that may affect communications in the second cell associated with the second network entity.

In a fifteenth aspect, alone or in combination with one or more of the first through fourteenth aspects, the potential-interference trigger event comprises at least one of a UE location changing more than a first threshold value, a signal level changing more than a second threshold value, a number of active beams associated with the first cell changing more than a third threshold value, a number of active UEs within the first cell changing more than a fourth threshold value, or a loading metric associated with the first cell changing more than a fifth threshold value.

In a sixteenth aspect, alone or in combination with one or more of the first through fifteenth aspects, communicating the cell information to the second network entity further comprises sending the cell information to the second network entity using a wired communication link interface, or transmitting the cell information to the second network entity using a wireless link.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
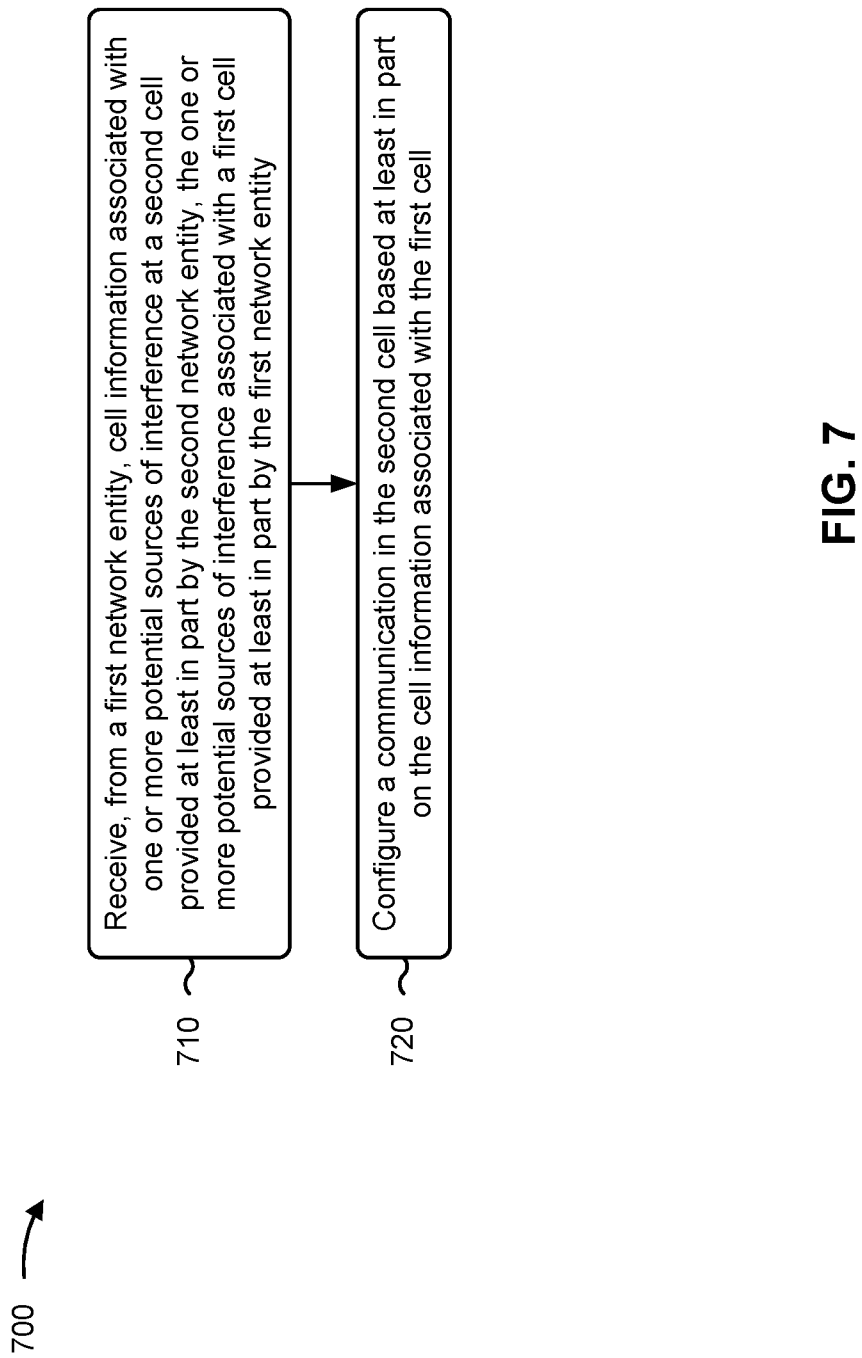
FIG. 7 is a diagram illustrating an example process performed by a base station, in accordance with the present disclosure.

FIG. 7 is a diagram illustrating an example process 700 performed, for example, by a second network entity, in accordance with the present disclosure. Example process 700 is an example where the second network entity (e.g., base station 110, apparatus 800) performs operations associated with inter-base station coordination for interference management. A network entity that performs aspects of the process 700 may alternatively or additionally perform aspects of process 600 as further described.

As shown in FIG. 7, in some aspects, process 700 may include receiving, from a first network entity, cell information associated with one or more potential sources of interference at a second cell provided at least in part by the second network entity, the one or more potential sources of interference associated with a first cell provided at least in part by the first network entity (block 710). For example, the second network entity (e.g., using communication manager 150 and/or communication reception component 802, depicted in FIG. 8) may receive, from a first network entity, cell information associated with one or more potential sources of interference at a second cell provided at least in part by the second network entity, the one or more potential sources of interference associated with a first cell provided at least in part by the first network entity, as described above.

As further shown in FIG. 7, in some aspects, process 700 may include configuring a communication in the second cell based at least in part on the cell information associated with the first cell (block 720). For example, the second network entity (e.g., using communication manager 150 and/or configuration identification component 810, depicted in FIG. 8) may configure a communication in the second cell based at least in part on the cell information associated with the first cell, as described above. This may help mitigate inter-base station interference originating from communications associated with a first cell, help reduce recovery errors at devices operating in the second cell, improve data throughput in the second cell, and/or reduce data-transfer latencies in the second cell.

Process 700 may include additional aspects, such as any single aspect or any combination of aspects described below and/or in connection with one or more other processes described elsewhere herein.

In a first aspect, the cell information includes at least one of a cell-specific scheduling parameter, or a UE-specific scheduling parameter.

In a second aspect, alone or in combination with the first aspect, the cell-specific scheduling parameter indicates a number of active UEs associated with the first cell, a loading metric associated with the first cell, a number of active beams associated with the first cell, a scheduling scheme associated with the first cell, a scheduling granularity associated with the first cell, or a sub-carrier spacing value associated with the first cell.

In a third aspect, alone or in combination with one or more of the first and second aspects, the scheduling scheme indicates at least one of a round-robin scheduling scheme, or a proportional fair scheduling scheme.

In a fourth aspect, alone or in combination with one or more of the first through third aspects, the scheduling granularity indicates at least one of a mini-slot level scheduling granularity, a slot level scheduling granularity, or a multi-slot level scheduling granularity.

In a fifth aspect, alone or in combination with one or more of the first through fourth aspects, the UE-specific scheduling parameter indicates a UE location, a link direction, a traffic type, a use case type, a beam characteristic, a cell group, a semi-persistent scheduling configuration, a scheduling granularity, or a sub carrier spacing metric.

In a sixth aspect, alone or in combination with one or more of the first through fifth aspects, the traffic type indicates at least one of File Transfer Protocol data traffic, Voice over Internet Protocol data traffic, clouding gaming data traffic, videoing streaming data traffic, conference call data traffic, or extending reality data traffic. This may help identify time durations with multiple transmissions (e.g., user data) and, subsequently, help identify communication configurations to mitigate and/or measure the interference.

In a seventh aspect, alone or in combination with one or more of the first through sixth aspects, the use case type indicates at least one of an enhanced Mobile Broadband type, an Ultra Reliable Low Latency Communications type, or a massive Machine Type Communications type.

In an eighth aspect, alone or in combination with one or more of the first through seventh aspects, the beam characteristic includes at least one of an azimuth angle associated with an active beam, an elevation angle of the active beam, a synchronization signal block index associated with the active beam, or a transmission configuration indication state associated with the active beam. This may improve how the second network entity mitigates inter-base station interference by improving how the second network entity selects active beams for communications in the second cell (e.g., by selecting active beams for communications in the second cell with different directions than active beams used in the first cell).

In a ninth aspect, alone or in combination with one or more of the first through eighth aspects, the cell information further comprises a number of active UEs within the first cell that are within a threshold distance of a boundary between a first cell coverage area of the first cell and a second cell coverage area of the second cell.

In a tenth aspect, alone or in combination with one or more of the first through ninth aspects, the cell information includes one or more UE-specific scheduling parameters associated with each active UE of the first cell operating at a location that satisfies a threshold distance of a boundary between a first cell coverage area of the first cell and a second cell coverage area of the second cell, and wherein the cell information omits UE-specific scheduling parameters associated with each active UE of the first cell that operates at a location that fails to satisfy the threshold distance of the boundary.

In an eleventh aspect, alone or in combination with one or more of the first through tenth aspects, process 700 includes characterizing the one or more potential sources of interference in the second cell based at least in part on the cell information associated with the first cell.

In a twelfth aspect, alone or in combination with one or more of the first through eleventh aspects, process 700 includes instructing a UE regarding when to generate an interference measurement based at least in part on the cell information.

In a thirteenth aspect, alone or in combination with one or more of the first through twelfth aspects, receiving the cell information from the first network entity further comprises periodically receiving the cell information from the first network entity, or aperiodically receiving the cell information from the first network entity.

In a fourteenth aspect, alone or in combination with one or more of the first through thirteenth aspects, process 700 includes communicating a query to the first network entity for the cell information, and receiving the cell information from the first network entity based at least in part on receiving the query. This enables the second network entity to request cell information from the first network entity when the second network entity identifies errors in communications (e.g., BER, BLER) and improve a response time for configuring communications in the second cell by reducing a wait time for receiving the cell information.

In a fifteenth aspect, alone or in combination with one or more of the first through fourteenth aspects, configuring the communication in the second cell based at least in part on the cell information associated with the first cell further comprises selecting a communication configuration for the communication based at least in part on the cell information and based at least in part on mitigating the one or more potential sources of interference.

In a sixteenth aspect, alone or in combination with one or more of the first through fifteenth aspects, configuring the communication further comprises selecting, as the communication configuration, at least one of a null tone configuration, a beam configuration, a frequency assignment, or a time assignment.

In a seventeenth aspect, alone or in combination with one or more of the first through sixteenth aspects, configuring the communication further comprises selecting the communication configuration based at least in part on a model trained using a machine learning algorithm, or selecting the communication configuration based at least in part on a static algorithm.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
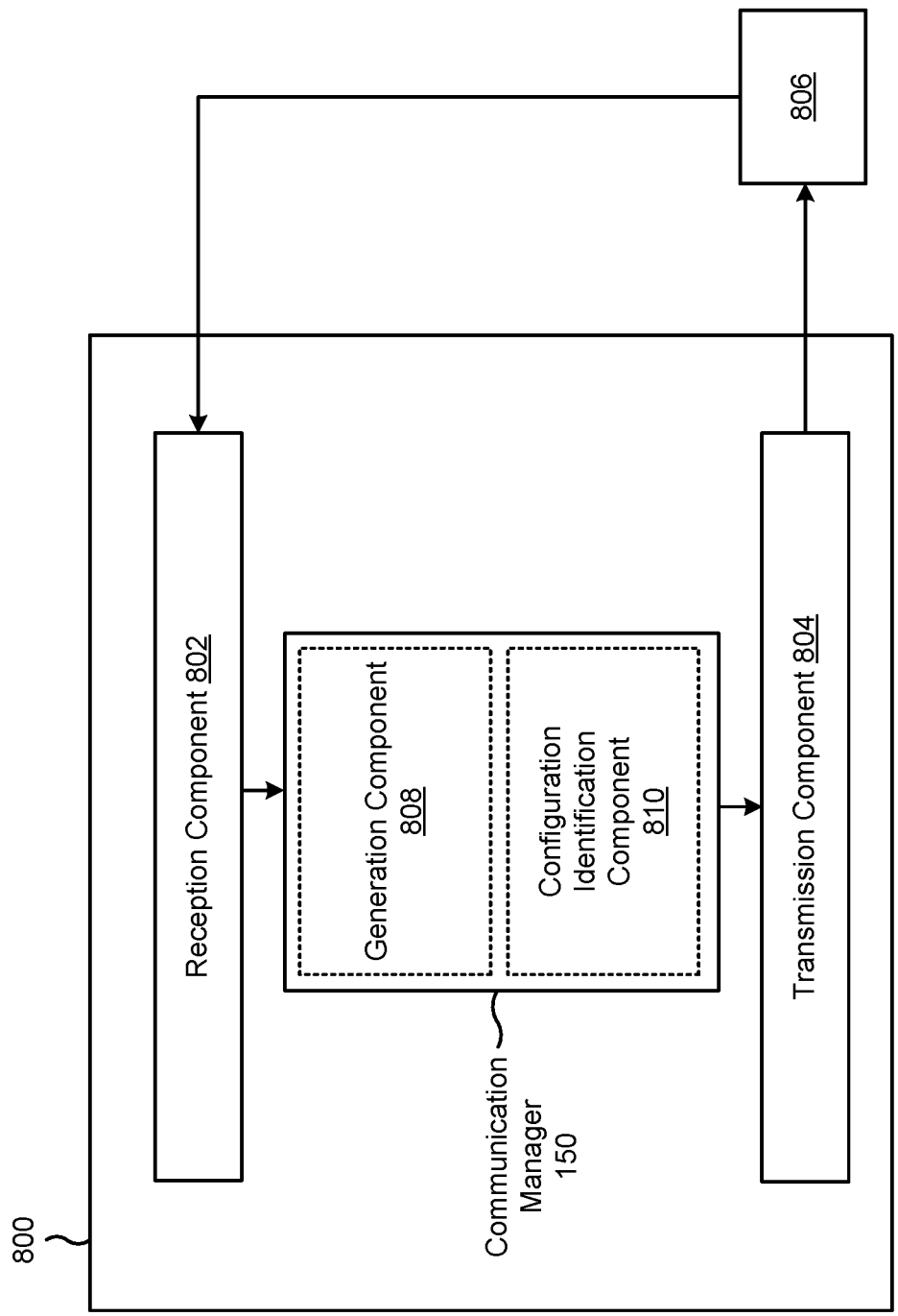
FIG. 8 is a diagram of an example apparatus for wireless communication in accordance with the present disclosure.

FIG. 8 is a diagram of an example apparatus 800 for wireless communication in accordance with the present disclosure. The apparatus 800 may be a network entity (e.g., a first base station and/or a second base station as described with regard to FIG. 4), or a network entity (e.g., a first base station and/or a second base station as described with regard to FIG. 4) that may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include one or more of a generation component 808 and/or a configuration identification component 810, among other examples.

In some aspects, the apparatus 800 may be configured to perform one or more operations described herein in connection with FIGS. 4-7. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The generation component 808 may generate cell information about a first cell provided at least in part by the base station (e.g., operating as a first base station as described with regard to FIG. 4), the cell information associated with one or more potential sources of interference at a second cell provided at least in part by a second base station, the one or more potential sources of interference being associated with the first cell.

The reception component 802 may receive a query from the second base station for the cell information.

The generation component 808 may communicate and/or direct the transmission component 804 to transmit the cell information to the second base station based at least in part on receiving the query.

The generation component 808 may identify a potential-interference trigger event.

The generation component 808 may communicate and/or direct the transmission component 804 to transmit the cell information to the second base station based at least in part on identifying the potential-interference trigger event.

The reception component 802 may receive, from a first base station, cell information associated with one or more potential sources of interference at a second cell provided at least in part by the base station (e.g., when operating as a second base station as described with regard to FIG. 4), the one or more potential sources of interference associated with a first cell provided at least in part by the first base station. The configuration identification component 810 may configure a communication in the second cell based at least in part on the cell information associated with the first cell (e.g., select a communication configuration).

The configuration identification component 810 may characterize the one or more potential sources of interference in the second cell based at least in part on the cell information associated with the first cell.

The configuration identification component 810 may instruct and/or direct the transmission component 804 to transmit instructions to a UE regarding when to generate an interference measurement based at least in part on the cell information.

The configuration identification component 810 may communicate and/or direct the transmission component 804 to transmit a query to the first base station for the cell information.

The reception component 802 may receive the cell information from the first base station based at least in part on receiving the query.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a first network entity, comprising: generating cell information about a first cell provided at least in part by the first network entity, the cell information associated with one or more potential sources of interference at a second cell provided at least in part by a second network entity, the one or more potential sources of interference being associated with the first cell; and communicating the cell information to the second network entity.

Aspect 2: The method of Aspect 1, wherein the cell information includes at least one of: a cell-specific scheduling parameter, or a user equipment (UE)-specific scheduling parameter.

Aspect 3: The method of Aspect 2, wherein the cell-specific scheduling parameter indicates at least one of: a number of active UEs associated with the first cell, a loading metric associated with the first cell, a number of active beams associated with the first cell a scheduling scheme associated with the first cell, a scheduling granularity associated with the first cell, or a sub-carrier spacing value associated with the first cell.

Aspect 4: The method of Aspect 3, wherein the scheduling scheme indicates at least one of: a round-robin scheduling scheme, or a proportional-fair scheduling scheme.

Aspect 5: The method of Aspect 3 or 4, wherein the scheduling granularity indicates at least one of: a mini-slot level scheduling granularity, a slot level scheduling granularity, or a multi-slot level scheduling granularity Aspect 6: The method of any one of Aspects 2-5, wherein, for a particular UE active in the first cell, the UE-specific scheduling parameter indicates: a UE location, a link direction, a traffic type, a use case type, a beam characteristic, a cell group, or a semi-persistent scheduling configuration.

Aspect 7: The method of Aspect 6, wherein the traffic type indicates at least one of: File Transfer Protocol data traffic, Voice over Internet Protocol data traffic, cloud gaming data traffic, video streaming data traffic, conference call data traffic, or extended reality data traffic.

Aspect 8: The method of Aspect 6 or 7, wherein the use case type indicates at least one of: an enhanced Mobile Broadband type, an Ultra Reliable Low Latency Communications type, or a massive Machine Type Communications type.

Aspect 9: The method of any one of Aspects 6-8, wherein the beam characteristic includes at least one of: an azimuth angle associated with an active beam, an elevation angle of the active beam, a synchronization signal block index associated with the active beam, or a transmission configuration indication state associated with the active beam.

Aspect 10: The method of any one of Aspects 1-9, wherein communicating the cell information to the second network entity further comprises: identifying the second network entity as a neighbor network entity; and communicating the cell information to the second network entity based at least in part on identifying the second network entity as the neighbor network entity.

Aspect 11: The method of any one of Aspects 1-10, wherein the cell information further indicates: a number of active user equipments (UEs) within the first cell that are within a threshold distance of a boundary between the first cell and the second cell.

Aspect 12: The method of any one of Aspects 1-11, wherein generating the cell information further comprises: including, in the cell information, one or more user equipment (UE)-specific scheduling parameters associated with each active UE of the first cell associated with a location that satisfies a threshold distance of a boundary between a first cell coverage area of the first cell and a second cell coverage area of the second cell; and omitting, from the cell information, one or more UE-specific scheduling parameters associated with each active UE of the first cell associated with a location that fails to satisfy the threshold distance of the boundary.

Aspect 13: The method of any one of Aspects 1-12, wherein communicating the cell information to the second network entity further comprises: periodically communicating the cell information to the second network entity; or aperiodically communicating the cell information to the second network entity.

Aspect 14: The method of any one of Aspects 1-13, further comprising: receiving a query from the second network entity for the cell information, and communicating the cell information to the second network entity based at least in part on receiving the query.

Aspect 15: The method of any one of Aspects 1-14, further comprising: identifying a potential-interference trigger event, and communicating the cell information to the second network entity based at least in part on identifying the potential-interference trigger event.

Aspect 16: The method of Aspect 15, wherein the potential-interference trigger event comprises at least one of: a user equipment (UE) location changing more than a first threshold value, a signal level changing more than a second threshold value, a number of active beams associated with the first cell changing more than a third threshold value, a number of active UEs within the first cell changing more than a fourth threshold value, or a loading metric associated with the first cell changing more than a fifth threshold value.

Aspect 17: The method of an one of Aspects 1-16, wherein communicating the cell information to the second network entity further comprises: sending the cell information to the second network entity using a wired communication link interface; or transmitting the cell information to the second network entity using a wireless link.

Aspect 18: A method of wireless communication performed by a second network entity, comprising: receiving, from a first network entity, cell information associated with one or more potential sources of interference at a second cell provided at least in part by the second network entity, the one or more potential sources of interference associated with a first cell provided at least in part by the first network entity; and configuring a communication in the second cell based at least in part on the cell information associated with the first cell.

Aspect 19: The method of Aspect 18, wherein the cell information includes at least one of: a cell-specific scheduling parameter, or a user equipment (UE)-specific scheduling parameter.

Aspect 20: The method of Aspect 19, wherein the cell-specific scheduling parameter indicates: a number of active UEs associated with the first cell, a loading metric associated with the first cell, a number of active beams associated with the first cell, a scheduling scheme associated with the first cell, a scheduling granularity associated with the first cell, or a sub-carrier spacing value associated with the first cell.

Aspect 21: The method of Aspect 20, wherein the scheduling scheme indicates at least one of: a round-robin scheduling scheme, or a proportional fair scheduling scheme.

Aspect 22: The method of Aspects 20 or 21, wherein the scheduling granularity indicates at least one of: a mini-slot level scheduling granularity, a slot level scheduling granularity, or a multi-slot level scheduling granularity.

Aspect 23: The method of any one of Aspects 19-22, wherein, for a particular UE active in the first cell, the UE-specific scheduling parameter indicates: a UE location, a link direction, a traffic type, a use case type, a beam characteristic, a cell group, or a semi-persistent scheduling configuration.

Aspect 24: The method of Aspect 23, wherein the traffic type indicates at least one of: File Transfer Protocol data traffic, Voice over Internet Protocol data traffic, cloud gaming data traffic, video streaming data traffic, conference call data traffic, or extended reality data traffic.

Aspect 25: The method of Aspect 23 or 24, wherein the use case type indicates at least one of: an enhanced Mobile Broadband type, an Ultra Reliable Low Latency Communications type, or a massive Machine Type Communications type.

Aspect 26: The method of any one of Aspects 23-25, wherein the beam characteristic includes at least one of: an azimuth angle associated with an active beam, an elevation angle of the active beam, a synchronization signal block index associated with the active beam, or a transmission configuration indication state associated with the active beam.

Aspect 27: The method of any one of Aspects 18-26, wherein the cell information further comprises: a number of active user equipments (UEs) within the first cell that are within a threshold distance of a boundary between a first cell coverage area of the first cell and a second cell coverage area of the second cell.

Aspect 28: The method of any one of Aspects 18-27, wherein the cell information includes one or more user equipment (UE)-specific scheduling parameters associated with each active UE of the first cell operating at a location that satisfies a threshold distance of a boundary between a first cell coverage area of the first cell and a second cell coverage area of the second cell, and wherein the cell information omits UE-specific scheduling parameters associated with each active UE of the first cell that operates at a location that fails to satisfy the threshold distance of the boundary.

Aspect 29: The method of any one of Aspects 18-28, further comprising: characterizing the one or more potential sources of interference in the second cell based at least in part on the cell information associated with the first cell.

Aspect 30: The method of any one of Aspects 18-29, further comprising: instructing a user equipment (UE) regarding when to generate an interference measurement based at least in part on the cell information.

Aspect 31: The method of any one of Aspects 18-30, wherein receiving the cell information from the first network entity further comprises: periodically receiving the cell information from the first network entity, or aperiodically receiving the cell information from the first network entity.

Aspect 32: The method of any one of Aspects 18-31, further comprising: communicating a query to the first network entity for the cell information, and receiving the cell information from the first network entity based at least in part on receiving the query.

Aspect 33: The method of any one of Aspects 18-32, wherein configuring the communication in the second cell based at least in part on the cell information associated with the first cell further comprises: selecting a communication configuration for the communication based at least in part on the cell information and based at least in part on mitigating the one or more potential sources of interference.

Aspect 34: The method of Aspect 33, wherein configuring the communication further comprises: selecting, as the communication configuration, at least one of: a null tone configuration, a beam configuration, a frequency assignment, or a time assignment.

Aspect 35: The method of Aspect 33 or Aspect 34, wherein configuring the communication further comprises: selecting the communication configuration based at least in part on a model trained using a machine learning algorithm; or selecting the communication configuration based at least in part on a static algorithm.

Aspect 36: An apparatus for wireless communication at a device, comprising a processor; memory coupled with the processor; and instructions stored in the memory and executable by the processor to cause the apparatus to perform the method of one or more of Aspects 1-35.

Aspect 37: A device for wireless communication, comprising a memory and one or more processors coupled to the memory, the one or more processors configured to perform the method of one or more of Aspects 1-35, or the memory storing instructions executable by the one or more processors to cause the device to perform the method of one or more of Aspects 1-35.

Aspect 38: An apparatus for wireless communication, comprising at least one means for performing the method of one or more of Aspects 1-35.

Aspect 39: A non-transitory computer-readable medium storing code for wireless communication, the code comprising instructions executable by a processor to perform the method of one or more of Aspects 1-35.

Aspect 40: A non-transitory computer-readable medium storing a set of instructions for wireless communication, the set of instructions comprising one or more instructions that, when executed by one or more processors of a device, cause the device to perform the method of one or more of Aspects 1-35.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first network entity, comprising:
    a memory; and
    one or more processors, coupled to the memory, the memory storing instructions executable by the one or more processors to cause the first network entity to:
        generate cell information about a first cell provided at least in part by the first network entity, the cell information associated with one or more potential sources of interference at a second cell provided at least in part by a second network entity, the one or more potential sources of interference being associated with the first cell; and
        communicate the cell information to the second network entity based at least in part on identification of the second network entity as a neighbor network entity.

2. The apparatus of claim 1, wherein the cell information includes at least one of:
    a cell-specific scheduling parameter, or
    a user equipment (UE)-specific scheduling parameter.

3. The apparatus of claim 2, wherein the cell-specific scheduling parameter indicates at least one of:
    a number of active UEs associated with the first cell,
    a loading metric associated with the first cell,
    a number of active beams associated with the first cell,
    a scheduling scheme associated with the first cell,
    a scheduling granularity associated with the first cell, or
    a sub-carrier spacing value associated with the first cell.

4. The apparatus of claim 2, wherein, for a particular UE active in the first cell, the UE-specific scheduling parameter indicates:
    a UE location,
    a link direction,
    a traffic type,
    a use case type,
    a beam characteristic,
    a cell group, or
    a semi-persistent scheduling configuration.

5. The apparatus of claim 1, wherein the memory stores further instructions that, to communicate the cell information to the second network entity, are executable by the one or more processors to cause the first network entity to:
    identify the second network entity as the neighbor network entity based at least in part on one or more of:
        the first network entity and the second network entity having adjacent cell borders,
        the first network entity and the second network entity having overlapping cell coverage areas,
        the first network entity being located within a threshold distance of the second network entity,
        an interference power level of the second network entity satisfying a power-level threshold value,
        information from a core network that indicates the second network entity is a neighbor network entity, or
        a stored file that indicates the second network entity is a neighbor network entity.

6. The apparatus of claim 1, wherein the cell information further indicates:
    a number of active user equipments (UEs) within the first cell that are within a threshold distance of a boundary between the first cell and the second cell.

7. The apparatus of claim 1, wherein the memory stores further instructions that, to generate the cell information, are executable by the one or more processors to cause the first network entity to:
    include, in the cell information, one or more user equipment (UE)-specific scheduling parameters associated with each active UE of the first cell associated with a location that satisfies a threshold distance of a boundary between a first cell coverage area of the first cell and a second cell coverage area of the second cell; and
    omit, from the cell information, one or more UE-specific scheduling parameters associated with each active UE of the first cell associated with a location that fails to satisfy the threshold distance of the boundary.

8. The apparatus of claim 1, wherein the memory stores further instructions that, to communicate the cell information to the second network entity, are executable by the one or more processors to cause the first network entity to:
    periodically communicate the cell information to the second network entity; or
    aperiodically communicate the cell information to the second network entity.

9. The apparatus of claim 1, wherein the memory stores further instructions that are executable by the one or more processors to cause the first network entity to:
    receive a query from the second network entity for the cell information, and communicate the cell information to the second network entity based at least in part on receiving the query.

10. The apparatus of claim 1, wherein the memory stores further instructions that are executable by the one or more processors to cause the first network entity to:
identify a potential-interference trigger event, and
communicate the cell information to the second network entity based at least in part on identifying the potential-interference trigger event.

11. The apparatus of claim 10, wherein the potential-interference trigger event comprises at least one of:
a user equipment (UE) location changing more than a first threshold value,
a signal level changing more than a second threshold value,
a number of active beams associated with the first cell changing more than a third threshold value,
a number of active UEs within the first cell changing more than a fourth threshold value, or
a loading metric associated with the first cell changing more than a fifth threshold value.

12. An apparatus for wireless communication at a second network entity, comprising:
a memory; and
one or more processors, coupled to the memory, the memory storing instructions executable by the one or more processors to cause the second network entity to:
receive, from a first network entity, cell information associated with one or more potential sources of interference at a second cell provided at least in part by the second network entity, the one or more potential sources of interference associated with a first cell provided at least in part by the first network entity, the second network entity being a neighbor network entity to the first network entity; and
configure a communication in the second cell based at least in part on the cell information associated with the first cell.

13. The apparatus of claim 12, wherein the cell information includes at least one of:
a cell-specific scheduling parameter, or
a user equipment (UE)-specific scheduling parameter.

14. The apparatus of claim 13, wherein the cell-specific scheduling parameter indicates:
a number of active UEs associated with the first cell,
a loading metric associated with the first cell,
a number of active beams associated with the first cell,
a scheduling scheme associated with the first cell,
a scheduling granularity associated with the first cell, or
a sub-carrier spacing metric associated with the first cell.

15. The apparatus of claim 13, wherein, for a particular UE active in the first cell, the UE-specific scheduling parameter indicates:
a UE location,
a link direction,
a traffic type,
a use case type,
a beam characteristic,
a cell group, or
a semi-persistent scheduling configuration.

16. The apparatus of claim 12, wherein the cell information further comprises:
a number of active user equipments (UEs) within the first cell that are within a threshold distance of a boundary between a first cell coverage area of the first cell and a second cell coverage area of the second cell.

17. The apparatus of claim 12, wherein the cell information includes one or more user equipment (UE)-specific scheduling parameters associated with each active UE of the first cell operating at a location that satisfies a threshold distance of a boundary between a first cell coverage area of the first cell and a second cell coverage area of the second cell, and
wherein the cell information omits UE-specific scheduling parameters associated with each active UE of the first cell that operates at a location that fails to satisfy the threshold distance of the boundary.

18. The apparatus of claim 12, wherein the memory stores further instructions that are executable by the one or more processors to cause the second network entity to:
characterize the one or more potential sources of interference in the second cell based at least in part on the cell information associated with the first cell.

19. The apparatus of claim 12, wherein the memory stores further instructions that are executable by the one or more processors to cause the second network entity to:
instruct a user equipment (UE) regarding when to generate an interference measurement based at least in part on the cell information.

20. The apparatus of claim 12, wherein the memory stores further instructions that are executable by the one or more processors to cause the second network entity to:
communicate a query to the first network entity for the cell information, and
receive the cell information from the first network entity based at least in part on receiving the query.

21. The apparatus of claim 12, wherein the memory stores further instructions that, to configure the communication in the second cell based at least in part on the cell information associated with the first cell, are executable by the one or more processors to cause the second network entity to:
select a communication configuration for the communication based at least in part on the cell information and based at least in part on mitigating the one or more potential sources of interference.

22. The apparatus of claim 21, wherein the memory stores further instructions that, to configure the communication, are executable by the one or more processors to cause the second network entity to:
select, as the communication configuration, at least one of:
a null tone configuration,
a beam configuration,
a frequency assignment, or
a time assignment.

23. A method of wireless communication performed by a first network entity, comprising:
generating cell information about a first cell provided at least in part by the first network entity, the cell information associated with one or more potential sources of interference at a second cell provided at least in part by a second network entity, the one or more potential sources of interference being associated with the first cell; and
communicating the cell information to the second network entity based at least in part on identification of the second network entity as a neighbor network entity.

24. The method of claim 23, wherein the cell information includes at least one of:
a cell-specific scheduling parameter, or
a user equipment (UE)-specific scheduling parameter.

25. The method of claim 23, wherein generating the cell information further comprises:

including, in the cell information, one or more user equipment (UE)-specific scheduling parameters associated with each active UE of the first cell associated with a location that satisfies a threshold distance of a boundary between a first cell coverage area of the first cell and a second cell coverage area of the second cell; and omitting, from the cell information, one or more UE-specific scheduling parameters associated with each active UE of the first cell associated with a location that fails to satisfy the threshold distance of the boundary.

26. The method of claim 23, further comprising:
identifying a potential-interference trigger event, and
communicating the cell information to the second network entity based at least in part on identifying the potential-interference trigger event.

27. A method of wireless communication performed by a second network entity, comprising:
receiving, from a first network entity, cell information associated with one or more potential sources of interference at a second cell provided at least in part by the second network entity, the one or more potential sources of interference associated with a first cell provided at least in part by the first network entity, the second network entity being a neighbor network entity to the first network entity; and
configuring a communication in the second cell based at least in part on the cell information associated with the first cell.

28. The method of claim 27, wherein the cell information includes at least one of:
a cell-specific scheduling parameter, or
a user equipment (UE)-specific scheduling parameter.

29. The method of claim 27, further comprising:
characterizing the one or more potential sources of interference in the second cell based at least in part on the cell information associated with the first cell.

30. The method of claim 27, wherein configuring the communication in the second cell based at least in part on the cell information associated with the first cell further comprises:
selecting a communication configuration for the communication based at least in part on the cell information and based at least in part on mitigating the one or more potential sources of interference.

* * * * *